United States Patent

Friese

[11] 4,195,219
[45] Mar. 25, 1980

[54] HEATING APPARATUS
[75] Inventor: Egon F. Friese, Tustin, Calif.
[73] Assignee: International Telephone and Telegraph Corporation, New York, N.Y.
[21] Appl. No.: 907,552
[22] Filed: May 19, 1978
[51] Int. Cl.[2] .............................................. H05R 1/02
[52] U.S. Cl. ................................. 219/388; 219/229; 219/243; 219/85 D; 264/249; 264/272; 264/274; 339/217 S
[58] Field of Search ..................... 219/388, 85 D, 118, 219/242, 241, 243, 221, 229; 156/583; 264/249, 272, 274

[56] References Cited
U.S. PATENT DOCUMENTS

| 2,638,964 | 5/1953 | Andia | 219/243 |
| 2,926,231 | 2/1960 | McDowell | 219/85 D |
| 3,157,553 | 11/1964 | Spallina | 219/243 |
| 3,410,472 | 11/1968 | Weller et al. | 219/241 |
| 3,494,998 | 2/1970 | Anhalt | 264/249 |
| 3,569,665 | 3/1971 | Hager, Jr. | 219/243 |
| 3,619,828 | 11/1971 | Ogilby | 219/229 |
| 3,646,577 | 2/1972 | Ernst | 219/241 |
| 4,114,976 | 9/1978 | Selvin et al. | 339/217 S |

Primary Examiner—B. A. Reynolds
Assistant Examiner—Bernard Roskoski
Attorney, Agent, or Firm—A. Donald Stolzy

[57] ABSTRACT

A temperature controlled heat delivery head for heat staking electrical contact retention clips in rapid succession in an insulator. A large heat-conductive body acts to store heat and to deliver it to a substantially smaller heat-conductive projection. The body is maintained at, for example, about 820° F. The projection is maintained at, for example, about 830° F.

15 Claims, 11 Drawing Figures

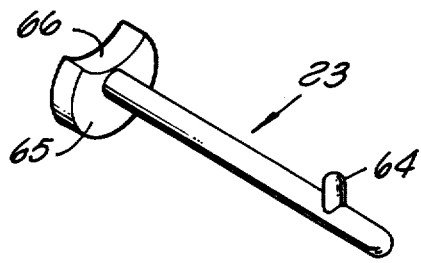
FIG. 3
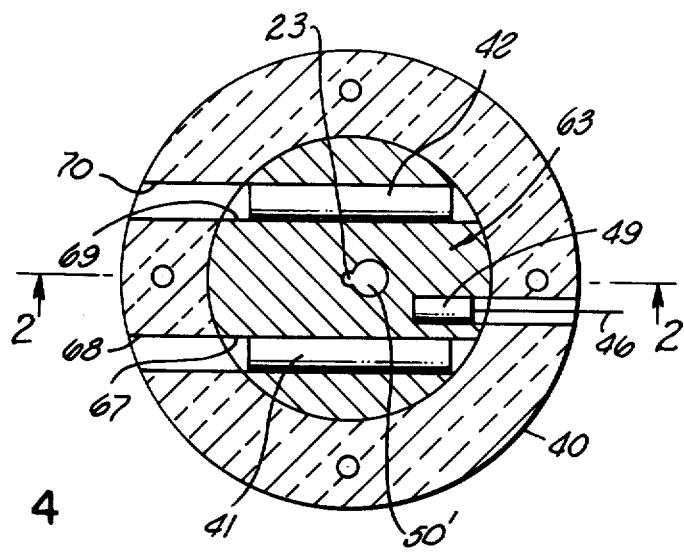
FIG. 4
FIG. 10 PRIOR ART
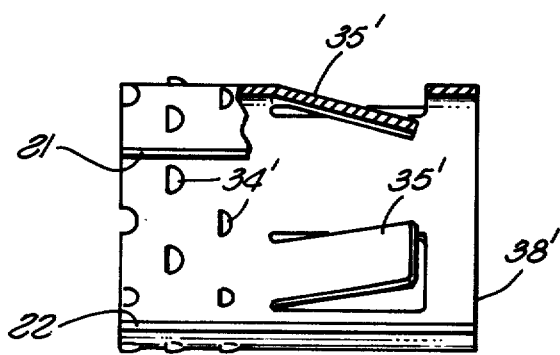
FIG. 11 PRIOR ART
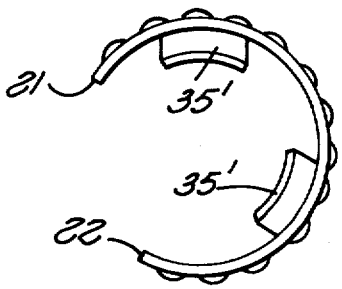

STEP 1: INSTALL CLIP IN CAVITY.

STEP 2: INSERT CLIP. THEN HEAT EITHER OR BOTH OF CLIP AND PROBE BEFORE OR AFTER INSERTION.

STEP 3: EMBED BARBS IN DIELECTRIC UNDER HEAT AND PRESSURE

STEP 4: REMOVE PROBE BARBS RETAIN CLIP IN CAVITY.

HEATING APPARATUS

BACKGROUND OF THE INVENTION

This invention relates to temperature controlled heaters, and more particularly to heat delivery heads for delivery of heat to a work piece such as, for example, an assembly of electrical contact retention clips and an insulator to heat stake each clip in the insulator in succession.

SUMMARY OF THE INVENTION

According to one aspect of the present invention, there is provided heating apparatus comprising: a delivery heat including a heat conductive storage body and a heat conductive projection fixed relative to said body, said projection extending outwardly of said body to deliver heat to each successive one of a plurality of work pieces, said projection being in heat conductive relation with said body; a first thermocouple fixed contiguous to said projection and being sensitive to the temperature of said projection; a second thermocouple fixed contiguous to said body and being sensitive to the temperature of said body; a first heating element fixed relative to said projection in heat conductive relation therewith; a second heating element fixed relative to said body in heat conductive relation therewith; first means connected from said first thermocouple to said first heating element to keep said projection at a first predetermined approximately constant temperature, said first temperature being the working temperature of a work piece; and second means connected from said second thermostat to said second heating element to keep said body at a second predetermined approximately constant temperature, said body having a size and said first and second means acting in a manner such that heat is quickly resupplied to said projection after heat therein has been conducted to a work piece so that said projection quickly regains said working temperature before engaging the next one of said work pieces thus making possible increased production.

According to another aspect of the present invention, there is provided heating apparatus comprising: a delivery head including a heat conductive storage body and a heat conductive projection fixed relative to said body, said projection extending outwardly of said body to deliver heat to each successive one of a plurality of work pieces, said projection being in heat conductive relation with said body; a thermocouple fixed contiguous to said body and being sensitive to the temperature of said body; a heating element fixed relative to said body in heat conductive relation therewith; and means connected from said thermocouple to said heating element to keep said body at a predetermined approximately constant temperature, said body having a size and said means acting in a manner such that heat is quickly resupplied to said projection after heat therein has been conducted to a work piece so that said projection quickly regains said working temperature before engaging the next one of said work pieces thus making possible increased production, a first product of the mass and specific heat of said body being substantially larger than a second product of the mass and specific heat of said projection.

BRIEF DESCRIPTION OF THE DRAWINGS

In the accompanying drawings which illustrate exemplary embodiments of the present invention:

FIG. 3 is a perspective view of a heat conductive projection constructed in accordance with the present invention;

FIG. 4 is a transverse sectional view of the apparatus of FIG. 1, but taken on line 4—4 of FIG. 2, with elements 23 and 50' being shown schematically, rather than in detail.

FIG. 10 is a side elevational view, partly in section, of a clip formed from the blank shown in FIG. 8;

FIG. 11 is a right end elevational view of a contact retention clip illustrated in FIG. 10;

DESCRIPTION OF THE PREFERRED EMBODIMENTS

Figure 1:
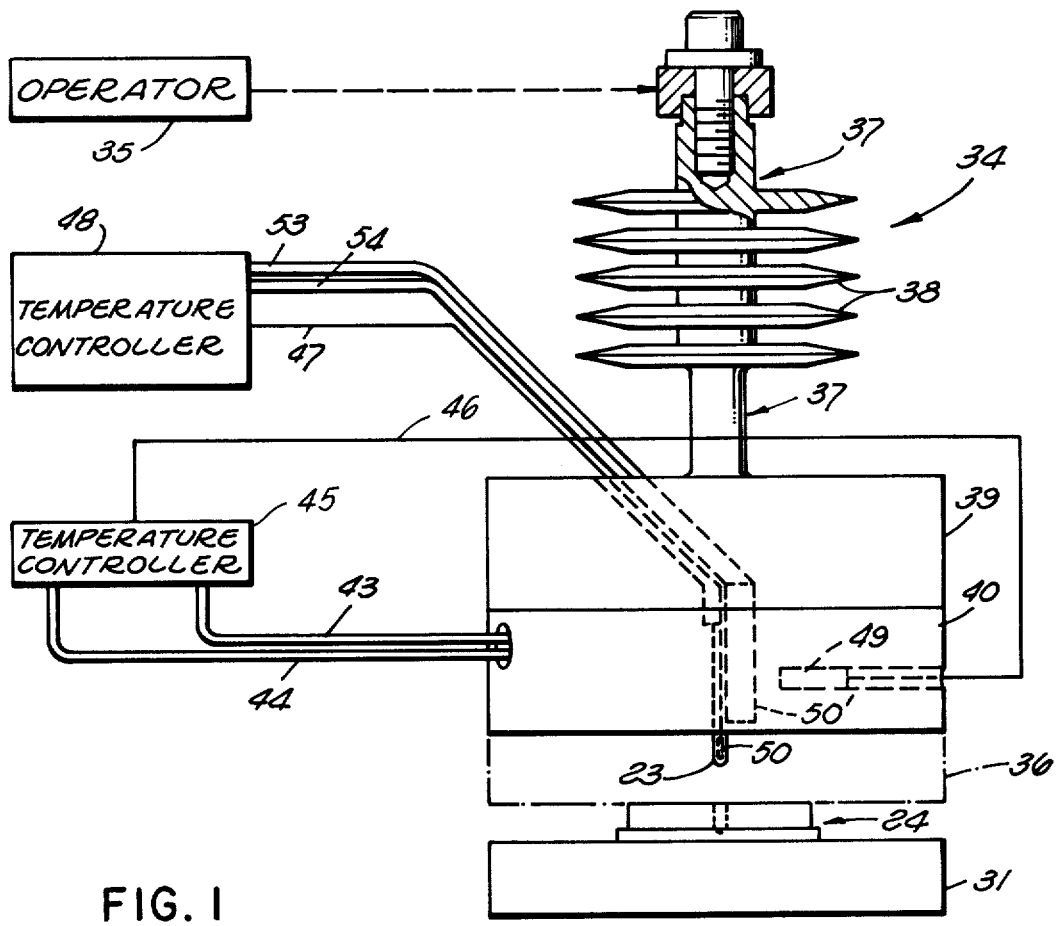
FIG. 1 is a side elevational view of apparatus constructed in accordance with the present invention.

In FIG. 1, a delivery head 34 is provided which is lowered and raised by an operator 35 to and from a position 36. Head 34 has a probe or projection 23 that fits inside an electrical contact retention clip, not shown in FIG. 1, positioned inside an insulator 24.

Insulator 24 is fixed relative to an X-Y table 31 releasably by conventional means, not shown. The said clip and insulator 24 will be described in detail hereinafter.

The purpose of the head 34 is, by means of projection 23, to heat a portion of insulator 24 and to stake the clip in a bore of the insulator 24.

Head 34 includes a shaft 37 having fins 38 machined thereon, fins 38 being integral with shaft 37.

Head 34 has refractory or insulator portions 39 and 40 fixed relative to each other, portion 39 being fixed relative to shaft 37.

Head 34 has two heating elements 41 and 42 shown in FIG. 4.

In FIG. 1, wires 43 and 44 connect heating elements 41 and 42 to a temperature controller 45. Heating elements 41 and 42 may be connected in parallel. Wires at 46 connect a thermocouple 49 to temperature controller 45.

A temperature controller 48 has inputs on wires 47 from a thermocouple 50. Thermocouple leads 46 and 47 may be conventional and include a wire inside a small metal tube.

Operator 35 may be omitted, and head 34 may be reciprocated vertically. Such reciprocation may be manually, if desired.

The clip employed in insulator 24 may be entirely conventional. Insulator 24, itself, may also be entirely conventional. The same is true of X-Y table 31.

Figure 2:
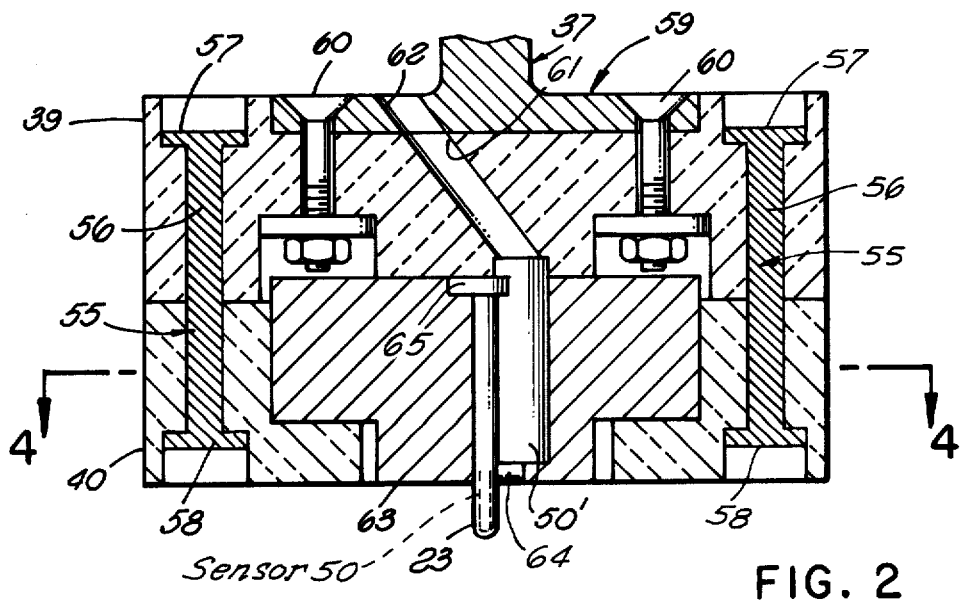
FIG. 2 is a vertical broken-away sectional view of the apparatus shown in FIG. 1, but taken on line 2—2 of FIG. 4.

Portions 39 and 40 in FIG. 2 may be secured together by any conventional means such as an assembly 55 including a pin 56 having heads 57 and 58. Four assemblies such as assembly 55 may be provided 90 degrees apart around the axis of shaft 37, if desired. Shaft 37 has a circular flange 59 integral therewith which is bolted to portion 39 at 60. If desired, four such locations at 60 may be provided, 90 degrees apart around the axis of shaft 37.

Portion 39 has a passage 61 in alignment with a passage 62 in flange 59 for wires 47, 53 and 54 shown in FIG. 1. Wires 53 and 54 are connected from temperature controller 48 to a heating element 50'.

Projection 23 is made of a material that is heat conductive. A heat conductive storage body is provided at 63. The materials of which projection 23 and body 63 are made may be identical or different. If identical, this material may be, for example, copper, or an alloy of copper made largely of copper.

Preferably projection 23 is bonded to thermocouple 50.

Projection 23 and thermocouple 50 may be bonded to or placed in heat conduction relation with body 63.

As shown, body 63 is held in a fixed position between head portions 39 and 40.

As shown in FIG. 1, temperature controller 45 holds the temperature of body 63 to about 820° F.

Temperature controller 48 holds the temperature of projection 23 to about 830° F.

A perspective view of projection 23 is shown in FIG. 3. A portion 64 extends beneath heating element 50' in FIG. 2. Projection 23 has a head 65 in FIG. 3 that rests in a corresponding recess in body 63. Head 65 has a scallop-shaped cutout 66 to receive heating element 50'.

Body 63 has passageways 67 and 69 in FIG. 4 in alignment with passageways 68 and 70, respectively, in head portion 40 so that wires 43 and 44 may be connected from controller 45 to heating elements 41 and 42.

Controllers 45 and 48 are employed to keep body 63 and projection 23 at substantially constant temperatures. Controllers 45 and 48 may thus be adjustable. Controllers 45 and 48 may be entirely conventional. For example, they may both be of the type sold as Model TPC-1 by the Weather Measure Corporation of Sacramento, California.

If desired, controllers 45 and 48 may be described as precision temperature controllers.

It is one outstanding feature of the present invention that a substantially constant temperature is employed.

It is another outstanding feature of the present invention that two substantially constant temperatures are employed.

It is still another outstanding feature of the present invention that body 63 is employed with projection 23. Moreover, body 63 has a mass and specific heat product substantially greater than that of projection 23.

Still further, when body 63 and projection 23 are made of the same material, the mass of body 63 is substantially greater than that of projection 23.

The mass or mass-specific heat product of body 63 may be over 2, over 15 or over 29 times the mass or mass-specific heat product of projection 23. This makes it possible, by keeping body 63 at an elevated temperature, to reheat projection 23 quickly to a slightly higher temperature to compensate for the heat loss from projection 23 to the clip and insulator 24 described in connection with FIG. 1.

Figure 5:
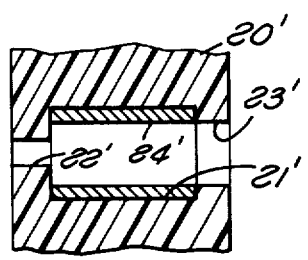
FIG. 5 is a broken away vertical sectional view through an electrical connector assembly which has been partially constructed in accordance with the prior art.
Figure 6:
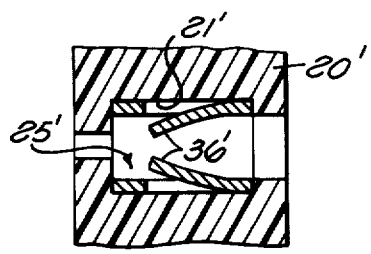
FIG. 6 is a broken away vertical sectional view of a prior art electrical connector assembly.

In FIG. 5, a prior art method of fabricating an electrical connector assembly is shown including an insulator 20' having an internal bore 21', and counter bores 22' and 23'. When insulator 20' is molded, an aluminum sleeve 24' is located on a core pin (not shown), and insulator 20' is molded around sleeve 24'. When insulator 20' has been molded around sleeve 24' as shown in FIG. 5, sleeve 24' is removed from bore 21' by etching with an acid. An electrical contact retention clip for an electrical connector is shown in FIG. 6 at 25'. Clip 25' is placed in bore 21'. Clip 25' may be similar to or identical to one of the clips disclosed in U.S. Pat. No. 3,158,424 issued Nov. 24, 1964. Clip 25' releasably retains an electrical connector contact, not shown.

The prior art method of making the electrical connector assembly shown in FIG. 6 is expensive because it is expensive to etch sleeve 24' in FIG. 5, and it is expensive to insert clip 25' in bore 21' shown in FIG. 6.

Figure 7:
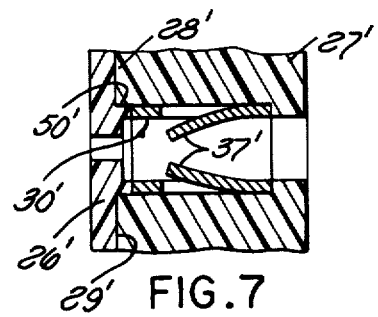
FIG. 7 is a broken away vertical sectional view of another prior art electrical connector assembly.

Another prior art electrical connector assembly is shown in FIG. 7 including two insulators 26' and 27' which may be cemented together along lines 28' and 29'. A clip is provided at 30' which, if desired, may be identical to clip 25'. Insulators 26' and 27' are molded, assembled to clip 30', and cemented together. The electrical connector assembly of the prior art shown in FIG. 7 is expensive to make because it requires two parts, a connecting operation, and thin barriers 50' to avoid voltage breakdown.

The contact retention assembly disclosed in U.S. Pat. No. 3,494,998 issued Feb. 10, 1970, has a construction similar to that illustrated in FIG. 6. However, it discloses a rear portion of an insulator that is often uneven so that the push-out forces for the clips are not uniform.

Figure 8:
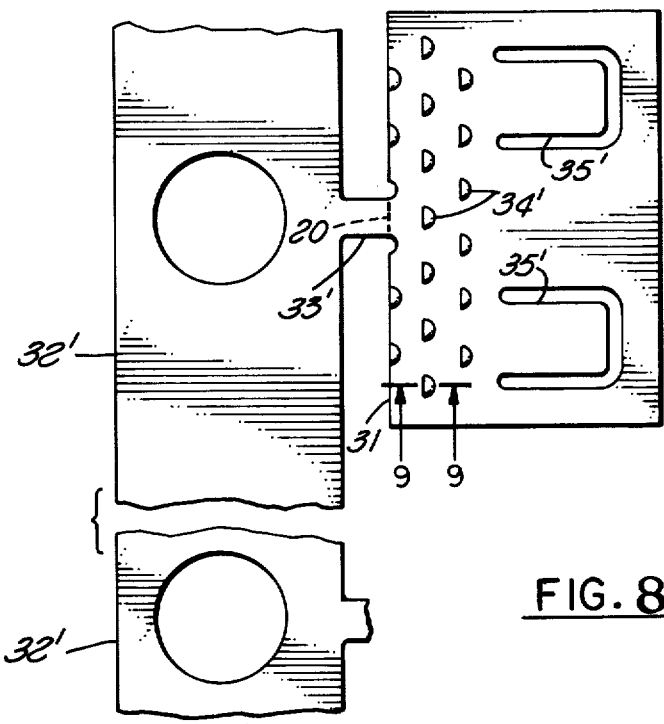
FIG. 8 is a top plan view of a formed blank from which a prior art contact retention clip is fabricated.
Figure 9:
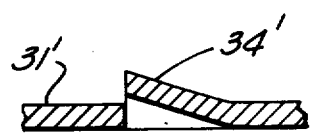
FIG. 9 is a vertical sectional view through a portion of the blank shown in FIG. 8, taken along line 9—9 therein.

In accordance with the present invention, a conventional blank 31' of resilient sheet metal shown in FIG. 8 may be continually made on a strip 32' and may be connected thereto by means illustrated at 33' which is eventually sheared from blank 31' at 20. The blank 31' is substantially flat except for barbs 34' shown in FIGS. 8 and 9. The barbs 34' are stamped out of the material of the blank 31' thus leaving small apertures in the blanks, as seen in FIG. 9. The blank 31' embodies leaf spring tines 35' similar to or identical to tines 36' and 37' shown in FIGS. 6 and 7, respectively. The blank 31' is partially formed into a contact retention clip as illustrated at 38' in FIGS. 10 and 11 having a generally cylindrical configuration.

A one-piece molded insulator body 12" made of a thermally deformable material is employed for mounting clip 38' or a clip 10" similar to or identical to clip 38' as shown in FIGS. 12, 13, 14 and 15 which are inverted. Before insertion in body 12" to the position shown in FIG. 12, edges 21 and 22 (FIG. 11) are abutted (but not connected) to form a cylinder.

After a clip is loaded into an insulator in accordance with the present invention, it may be heat staked as described herein. See also copending application Ser. No. 788,315 filed Apr. 18, 1977, by G. J. Selvin et al. for ELECTRICAL CONNECTOR ASSEMBLY AND METHOD OF MAKING THE SAME assigned to the assignee of the instant application.

Figure 12:
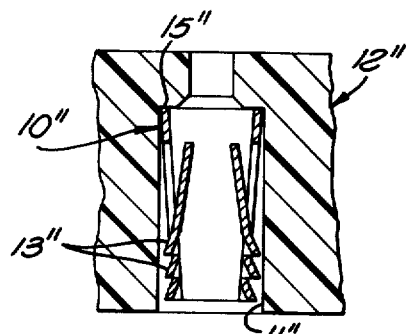
FIGS. 12, 13, 14 and 15 are broken away vertical sectional views of an insulator and a clip similar to that shown in FIG. 10 illustrating prior art steps which may be performed subsequent to or including those of the present invention to lodge the clip in a fixed position in a bore in the insulator.
Figure 13:
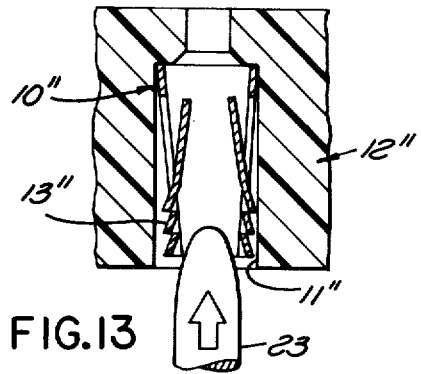
Figure 14:
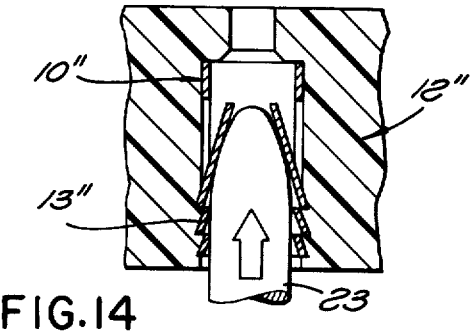
Figure 15:
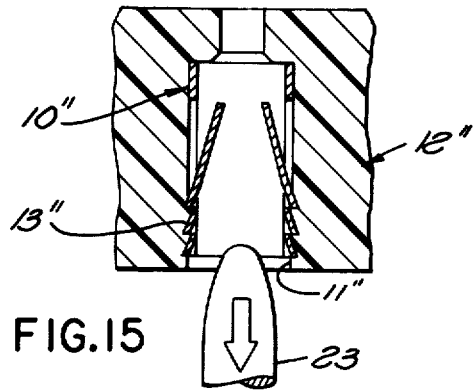

In general, the clip 10" is inserted into a cylindrical bore 11" in insulator body 12". Preferably, the forward end of the clip 10" abuts a shoulder 15" in the bore 11", as seen in FIG. 12. The clip 10" may frictionally engage the wall of the bore 11' when first inserted therein. The insulator material of body 12" surrounding the bore 11' is heated by projection or probe 23 to a temperature sufficient to cause body 12" to soften and flow under pressure. The clip 10" is caused to expand in the bore 11" so that barbs 13" thereon will become embedded in the softened insulator material as seen in FIG. 15. The softened insulator material totally surrounds the barbs 13" to prevent the possibility of Corona discharge degradation between adjacent clips in the insulator body. When the clip 10" is expanded in the bore 11", some of the softened insulator material will flow into the small apertures in the clip formed by the stamped out barbs 13". This will enhance retention of the clip 10" in bore 11" and will present moisture from the external environment from leaking through the apertures behind the clip wall. Thus, after loading in accordance with the present invention, by the above-described heat staking operation, the clip 10" is seized by the insulator 12" to hold the clip 10" firmly against axial movement in bore 11". The insulator material surrounding the bore 11" is heated because clip 10" is heated by probe 23. In this case the insulator material is heated by conduction.

Preferably, the diameter of the clip 10" in its relaxed or unstressed condition is greater than the diameter of the bore 11" in body 12".

If the clip 10" is relatively large and oversized with respect to the diameter of bore 11", it will possess relatively high hoop stress when held and inserted into the bore.

In a preferred embodiment of the invention, when the clip 10" is initially inserted into the bore 11", clip 10" simply frictionally engages the wall of the bore 11". Probe 23 is then pushed into the clip 10". The probe 23 has a diameter slightly larger than the inside diameter of clip 10" when the clip is inserted into bore 11". The end of the probe 23 is tapered to facilitate its insertion into the clip 10". Also, probe 23 is heated so that when it is pushed into the clip 10", heat from the probe 23 will transfer through the clip 10" by conduction to the insulator 12" causing the same to soften. Simultaneously with the probe 23 heating the insulator 12", the clip 10" is expanded by the probe 23 causing the barbs 13" in the clip 10" to be embedded in the softened insulator material surrounding bore 11". As stated previously, some insulator material will also be forced into the apertures in clip 10" resulting from the stamped out barbs 13". The probe 23 is then removed from bore 11". The softened insulator material will then cool and harden to seize the barbs and fixedly retain the clip 10" within the bore 11".

Figure 16:
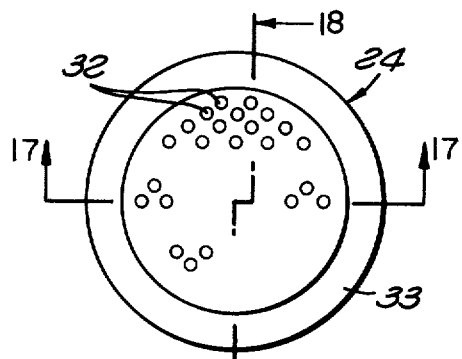
FIG. 16 is a top plan view of an insulator constructed in accordance with the present invention.
Figure 17:
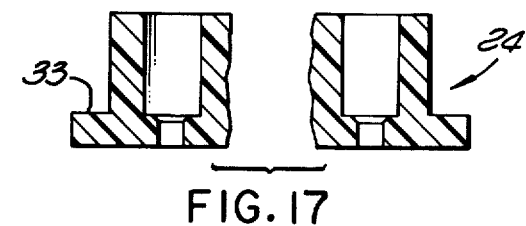
FIG. 17 is an enlarged vertical sectional view of the insulator taken on the line 17—17 shown in FIG. 16.
Figure 18:
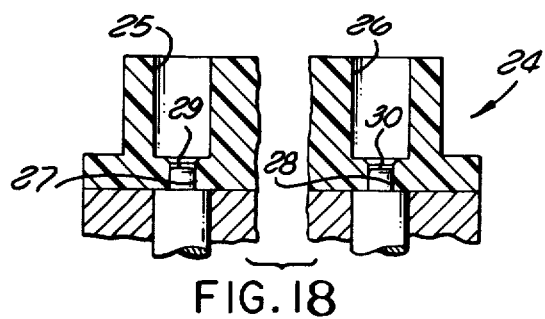
FIG. 18 is another enlarged vertical sectional view of the insulator taken on the line 18—18 shown in FIG. 16.

In FIG. 16, insulator 24 is provided which may be of the type employed with the present invention. Insulator 24 is different from conventional insulators in that two particularly located bores 25 and 26 are provided therein as shown in FIG. 18 having counterbores 27 and 28, respectively, in which respective pins 29 and 30 are located. Pins 29 and 30 locate insulator 24 relative to X-Y table 31 so that clips may be inserted in all the other bores 32 therein shown in FIG. 16, as well as in bores 25 and 26. Thus pins 29 and 30 may be fixed relative to X-Y table 31.

Insulator 24 also is held by a flange 33 which may be releasably clamped to X-Y table 31 by any conventional means.

What is claimed is:

1. Heating apparatus comprising: a delivery head including a heat conductive storage body and a heat conductive projection fixed relative to said body, said projection extending outwardly of said body to deliver heat to each successive one of a plurality of work pieces, said projection being in heat conductive relation with said body; a first thermocouple fixed contiguous to said projection and being sensitive to the temperature of said projection; a second thermocouple fixed contiguous to said body and being sensitive to the temperature of said body; a first heating element fixed relative to said projection in heat conductive relation therewith for supplying heat directly to said projection; a second heating element fixed relative to said body in heat conductive relation therewith for supplying heat directly to said body; first means connected from said first thermocouple to said first heating element to keep said projection at a first predetermined approximately constant temperature, said first temperature being the working temperature of a work piece; and second means connected from said second thermocouple to said second heating element to keep said body at a second predetermined approximately constant temperature, said body having a size and said first and second means acting in a manner such that heat is quickly resupplied to said projection after heat therein has been conducted to a work piece so that said projection quickly regains said working temperature before engaging the next one of said work pieces thus making possible increased production.

2. The invention as defined in claim 1, wherein said body is generally in the form of a right cylinder having a hole extending approximately through the center thereof, said projection being fixed in said hole with one end thereof extending beyond one end of said body.

3. The invention as defined in claim 2, wherein said first temperature is several hundred degrees Fahrenheit, said second temperature being a few degrees Fahrenheit less than said first temperature.

4. The invention as defined in claim 3, wherein said first temperature is about 830° F. and said second temperature is about 820° F.

5. The invention as defined in claim 4, wherein a first product of mass and specific heat of said body is substantially larger than a second product of the mass and specific heat of said projection.

6. The invention as defined in claim 5, wherein said projection and said body are made of substantially the same material, said material being largely copper.

7. The invention as defined in claim 6, wherein said body has a mass more than twice as large as that of said projection.

8. The invention as defined in claim 6, wherein said body has a mass more than 15 times as large as that of said projection.

9. The invention as defined in claim 6, wherein said body has a mass more than 29 times as large as said projection.

10. The invention as defined in claim 1, wherein said first temperature is several hundred degrees Fahrenheit, said second temperature being a few degrees Fahrenheit less than said first temperature.

11. The invention as defined in claim 10, wherein said first temperature is about 830° F. and said second temperature is about 820° F.

12. The invention as defined in claim 1, wherein a first product of mass and specific heat of said body is substantially larger than a second product of the mass and specific heat of said projection.

13. The invention as defined in claim 12, wherein said first product is more than twice as large as said second product.

14. The invention as defined in claim 12, wherein said first product is more than 15 times said second product.

15. The invention as defined in claim 12, wherein said first product is more than 29 times said second product.

* * * * *